United States Patent
Sutardja

(10) Patent No.: US 8,467,279 B2
(45) Date of Patent: Jun. 18, 2013

(54) MAGNETIC AND OPTICAL ROTATING STORAGE SYSTEMS WITH AUDIO MONITORING

(75) Inventor: Sehat Sutardja, Los Altos Hills, CA (US)

(73) Assignee: Marvell World Trade Ltd., St. Michael (BB)

( * ) Notice: Subject to any disclaimer, the term of this patent is extended or adjusted under 35 U.S.C. 154(b) by 13 days.

(21) Appl. No.: 13/155,018

(22) Filed: Jun. 7, 2011

(65) Prior Publication Data

US 2011/0261660 A1    Oct. 27, 2011

Related U.S. Application Data

(63) Continuation of application No. 11/652,203, filed on Jan. 11, 2007, now Pat. No. 7,957,243, which is a continuation of application No. 11/591,326, filed on Nov. 1, 2006, now Pat. No. 7,911,901.

(60) Provisional application No. 60/828,532, filed on Oct. 6, 2006, provisional application No. 60/820,189, filed on Jul. 24, 2006.

(51) Int. Cl.
    *G11B 20/18*      (2006.01)

(52) U.S. Cl.
    USPC ................................ 369/53.42; 369/53.43

(58) Field of Classification Search
    None
    See application file for complete search history.

(56) References Cited

U.S. PATENT DOCUMENTS

| | | | |
|---|---|---|---|
| 5,210,704 A | 5/1993 | Husseiny | |
| 5,727,928 A | 3/1998 | Brown | |
| 5,748,748 A | 5/1998 | Fischer et al. | |
| 5,757,937 A | 5/1998 | Itoh et al. | |
| 5,848,282 A | 12/1998 | Kang | |
| 5,926,386 A | 7/1999 | Ott et al. | |
| 5,929,581 A | 7/1999 | Van Brocklin et al. | |
| 6,266,203 B1 | 7/2001 | Street et al. | |
| 6,301,105 B2 | 10/2001 | Glorioso et al. | |
| 6,324,487 B1 | 11/2001 | Qian et al. | |
| 6,360,185 B1 | 3/2002 | Futawatari | |
| 6,472,848 B2 | 10/2002 | Stryker et al. | |
| 6,487,463 B1 | 11/2002 | Stepp | |
| 6,591,198 B1 | 7/2003 | Pratt | |
| 6,735,499 B2 | 5/2004 | Ohki et al. | |

(Continued)

FOREIGN PATENT DOCUMENTS

| | | |
|---|---|---|
| JP | S63-257053 | 10/1988 |
| JP | H9-127073 | 5/1997 |

(Continued)

OTHER PUBLICATIONS

The International Search Report and Written Opinion dated Jul. 25, 2008, for International Application No. PCT/US2007/015796, filed Jul. 11, 2007, 24 pages.

(Continued)

*Primary Examiner* — Paul Huber

(57) ABSTRACT

An integrated circuit for controlling a data storage device. The integrated circuit includes: a drive module configured to control operation of the data storage device, wherein the data storage device is of a particular quality; and an audio monitoring module in communication with the drive module, wherein the audio monitoring module is configured to analyze an audio signal generated by the data storage device while the drive module is controlling the operation of the data storage device. The particular quality of the data storage device is determinable based on the analysis of the audio signal.

18 Claims, 16 Drawing Sheets

U.S. PATENT DOCUMENTS

| | | |
|---|---|---|
| 6,781,258 B2 | 8/2004 | Hashimoto |
| 6,809,895 B1 | 10/2004 | Choi |
| 6,836,849 B2 | 12/2004 | Brock et al. |
| 6,935,130 B2 | 8/2005 | Cheng et al. |
| 6,965,175 B2 | 11/2005 | Hu et al. |
| 6,999,894 B2 | 2/2006 | Lin et al. |
| 7,304,470 B2 | 12/2007 | Chen et al. |
| 7,424,396 B2 | 9/2008 | Dodeja et al. |
| 2002/0101714 A1 | 8/2002 | Osecky et al. |
| 2002/0101715 A1 | 8/2002 | Osecky et al. |
| 2003/0142601 A1 | 7/2003 | Fioravanti |
| 2004/0120113 A1 | 6/2004 | Rapaich |
| 2004/0141620 A1 | 7/2004 | Mahoney et al. |
| 2004/0205403 A1 | 10/2004 | Markow et al. |
| 2005/0211426 A1 | 9/2005 | Ziarnik et al. |
| 2005/0243661 A1 | 11/2005 | Tormasi |
| 2006/0197824 A1 | 9/2006 | Honda et al. |
| 2007/0035874 A1 | 2/2007 | Wendel et al. |
| 2007/0086598 A1 | 4/2007 | De Callafon |
| 2007/0089011 A1 | 4/2007 | Dodeja et al. |

FOREIGN PATENT DOCUMENTS

| | | |
|---|---|---|
| JP | 2000-275096 | 10/2000 |
| JP | 2000-322814 | 11/2000 |
| JP | 2004-252531 | 1/2004 |
| JP | 2004-152336 | 5/2004 |
| JP | 2007-228477 | 6/2007 |

OTHER PUBLICATIONS

The Office Action issued in corresponding Japanese Patent Application No. 2009-521752, issued Jan. 31, 2012, and its English Translation.

MAGNETIC AND OPTICAL ROTATING STORAGE SYSTEMS WITH AUDIO MONITORING

CROSS-REFERENCE TO RELATED APPLICATIONS

This present disclosure is a continuation of U.S. application Ser. No. 11/652,203, filed on Jan. 11, 2007, which is a continuation of U.S. application Ser. No. 11/591,326 (now U.S. Pat. No. 7,911,901), filed on Nov. 1, 2006, which claims the benefit of: i) U.S. Provisional Application No. 60/828,532, filed on Oct. 6, 2006, and ii) U.S. Provisional Application No. 60/820,189, filed on Jul. 24, 2006.

This present disclosure is related to U.S. application Ser. No. 11/652,258 (now U.S. Pat. No. 7,890,196), filed on Jan. 11, 2007.

FIELD

The present disclosure relates to hard disk drive (HDD) and digital versatile disc (DVD) systems, and more particularly to audio monitoring of HDD and DVD systems.

BACKGROUND

The Background description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

Referring now to FIG. 1, a HDD system 10 is shown to include a HDD printed circuit board (PCB) 14. A buffer 18 stores read, write and/or volatile control data that is associated the control of the HDD system 10. The buffer 18 usually employs volatile memory having low latency. For example, synchronous dynamic random access memory (SDRAM) or other types of low latency memory may be used. Nonvolatile memory 19 such as flash memory may also be provided to store critical data such as nonvolatile control code.

A processor 22 arranged on the HDD PCB 14 performs data and/or control processing that is related to the operation of the HDD system 10. A hard disk control module (HDC) 26 communicates with an input/output interface 24 and with a spindle/voice coil motor (VCM) driver or module 30 and/or a read/write channel module 34. The HDC 26 coordinates control of the spindle/VCM driver 30, the read/write channel module 34 and the processor 22 and data input/output with a host 35 via the interface 24.

During write operations, the read/write channel module 34 encodes the data to be written onto a read/write device 59. The read/write channel module 34 processes the write signal for reliability and may apply, for example, error correction coding (ECC), run length limited coding (RLL), and the like. During read operations, the read/write channel module 34 converts an analog read signal output of the read/write device 59 to a digital read signal. The converted signal is then detected and decoded by known techniques to recover the data that was written on the HDD.

A hard disk drive assembly (HDDA) 50 includes one or more hard drive platters 52 that include magnetic coatings that store magnetic fields. The platters 52 are rotated by a spindle motor that is schematically shown at 54. Generally the spindle motor 54 rotates the hard drive platter 52 at a controlled speed during the read/write operations. One or more read/write arms 58 move relative to the platters 52 to read and/or write data to/from the hard drive platters 52. The spindle/VCM driver 30 controls the spindle motor 54, which rotates the platter 52. The spindle/VCM driver 30 also generates control signals that position the read/write arm 58, for example using a voice coil actuator, a stepper motor or any other suitable actuator.

The read/write device 59 is located near a distal end of the read/write arm 58. The read/write device 59 includes a write element such as an inductor that generates a magnetic field. The read/write device 59 also includes a read element (such as a magneto-resistive (MR) element) that senses the magnetic field on the platter 52. The HDDA 50 includes a preamp circuit 60 that amplifies the analog read/write signals. When reading data, the preamp circuit 60 amplifies low level signals from the read element and outputs the amplified signal to the read/write channel module 34. While writing data, a write current is generated that flows through the write element of the read/write device 59. The write current is switched to produce a magnetic field having a positive or negative polarity. The positive or negative polarity is stored by the hard drive platter 52 and is used to represent data.

Referring now to FIG. 2, a digital versatile disc (DVD) system 110 is shown to include a DVD PCB 114, which includes a buffer 118 that stores read data, write data and/or volatile control code that is associated the control of the DVD system 110. The buffer 118 may employ volatile memory such as SDRAM or other types of low latency memory. Nonvolatile memory 119 such as flash memory can also be used for critical data such as data relating to DVD write formats and/or other nonvolatile control code.

A processor 122 arranged on the DVD PCB 114 performs data and/or control processing that is related to the operation of the DVD system 110. The processor 122 also performs decoding of copy protection and/or compression/decompression as needed. A DVD control module 126 communicates with an input/output interface 124 and with a spindle/feed motor (FM) driver 130 and/or a read/write channel module 134. The DVD control module 126 coordinates control of the spindle/FM driver 130, the read/write channel module 134 and the processor 122 and data input/output via the interface 124.

During write operations, the read/write channel module 134 encodes the data to be written by an optical read/write (ORW) or optical read only (OR) device 159 to the DVD platter. The read/write channel module 134 processes the signals for reliability and may apply, for example, ECC, RLL, and the like. During read operations, the read/write channel module 134 converts an analog output of the ORW or OR device 159 to a digital signal. The converted signal is then detected and decoded by known techniques to recover the data that was written on the DVD.

A DVD assembly (DVDA) 150 includes a DVD platter 152 that stores data optically. The platter 152 is rotated by a spindle motor that is schematically shown at 154. The spindle motor 154 rotates the DVD platter 152 at a controlled and/or variable speed during the read/write operations. The ORW or OR device 159 moves relative to the DVD platter 152 to read and/or write data to/from the DVD platter 152. The ORW or OR device 159 typically includes a laser and an optical sensor.

For DVD read/write and DVD read only systems, the laser is directed at tracks on the DVD that contain lands and pits during read operations. The optical sensor senses reflections caused by the lands/pits. For DVD read/write (RW) applications, a laser may also be used to heat a die layer on the DVD platter during write operations. If the die is heated to one temperature, the die is transparent and represents one binary digital value. If the die is heated to another temperature, the die is opaque and represents the other binary digital value.

The spindle/FM driver 130 controls the spindle motor 154, which controllably rotates the DVD platter 152. The spindle/FM driver 130 also generates control signals that position the feed motor 158, for example using a voice coil actuator, a stepper motor or any other suitable actuator. The feed motor 158 typically moves the ORW or OR device 159 radially relative to the DVD platter 152. A laser driver 161 generates a laser drive signal based on an output of the read/write channel module 134. The DVDA 150 includes a preamp circuit 160 that amplifies analog read signals. When reading data, the preamp circuit 160 amplifies low level signals from the ORW or OR device and outputs the amplified signal to the read/write channel module 134.

The DVD system 110 further includes a codec module 140 that encodes and/or decodes video such as any of the MPEG formats. Audio and/or video digital signal processors and/or modules 142 and 144, respectively, perform audio and/or video signal processing, respectively.

SUMMARY

In one aspect, this specification describes an integrated circuit for controlling a data storage device. The integrated circuit includes: a drive module configured to control operation of the data storage device, wherein the data storage device is of a particular quality; and an audio monitoring module in communication with the drive module, wherein the audio monitoring module is configured to analyze an audio signal generated by the data storage device while the drive module is controlling the operation of the data storage device. The particular quality of the data storage device is determinable based on the analysis of the audio signal.

In another aspect, this specification describes a method for controlling a data storage device. The method includes: operating the data storage device, wherein the data storage device is of a particular quality; analyzing an audio signal generated by the data storage device during the operation of the data storage device; and determining the particular quality of the data storage device based on the analysis of the audio signal.

In still other features, the systems and methods described above are implemented by a computer program executed by one or more processors. The computer program can reside on a computer readable medium such as but not limited to memory, non-volatile data storage and/or other suitable tangible storage mediums.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
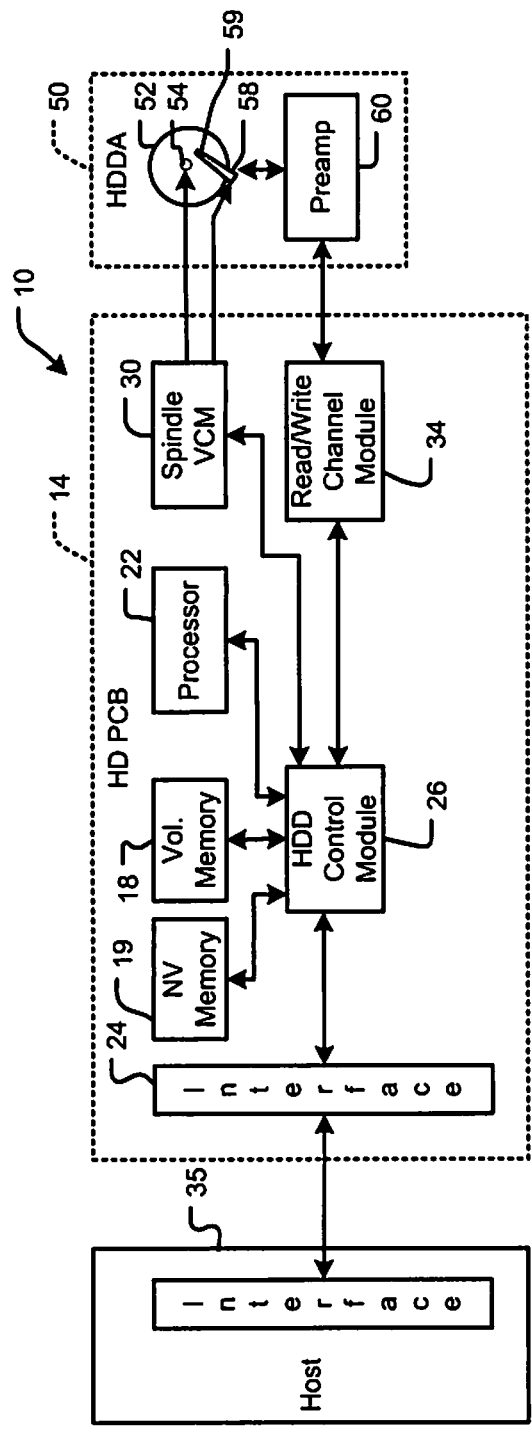
FIG. 1 is a functional block diagram of a HDD system according to the prior art.
Figure 2:
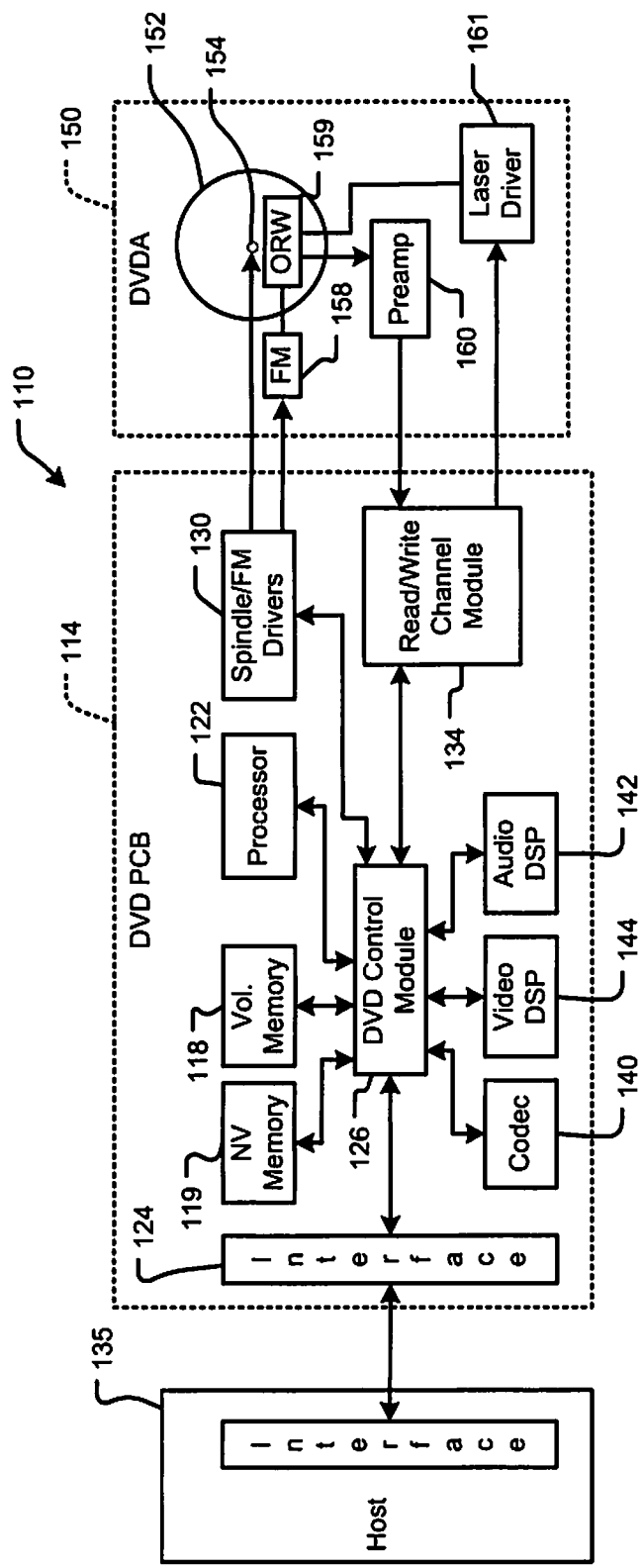
FIG. 2 is a functional block diagram of a DVD system according to the prior art.

The following description is merely exemplary in nature and is in no way intended to limit the disclosure, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

A microphone monitors noise generated by components of hard disk assemblies (HDDAs) and/or DVD assemblies (DVDAs). Due to the mechanical nature of the HDDA and/or DVDA, the noise generated by the motor, servo movement, air turbulence, intermittent head crash, loose components, and/or various mechanical resonances can be identified using an audio monitor module as will be described below. When a resonance mode of the component is detected, the audio monitoring module may increase or decrease the speed of the component by a predetermined amount or percentage. The predetermined amount may include fixed values, fixed percentages of a current speed, variable values or percentages, progressive values and/or other suitable values.

For example, the audio monitor module can use sub-band analysis. Operation of HDD and DVD systems can be improved by monitoring signal levels, frequencies and noise patterns as well as the changes of monitored parameters as a function of time. These systems may automatically adjust HDD or DVD operating parameters to lower acoustic noise. By doing so, user annoyance may be decreased. Adjusting operation of the HDDA or DVDA away from resonance modes of the mechanical components can be optimized during use for different HDD or DVD systems. In addition, real time monitoring of motor and/or servo noise may be used to predict future failure events. Analysis of historical data may be performed to estimate and monitor aging of the HDD or DVD systems.

The audio monitor module may also be used as a relatively low cost method for differentiating product quality. For example, this approach can be used to separate high quality or low quality drives from other medium-quality drives. Lower noise devices tend to be more reliable than the higher noise ones, particularly for HDD or DVD systems having the same or similar designs. In addition, real time monitoring of mechanical components can be used to improve future quality levels. While DVD systems are discussed herein, the present disclosure applied to compact discs (CDs) as well.

The microphone may be embedded on the HDDA or DVDA and/or embedded on a printed circuit board assembly (PCBA) of the HDD or DVD systems. If embedded in the HDDA or DVDA, the microphone can share a flex connector to reduce cost. In addition, an audio analog to digital converter (ADC) can be embedded on a system on chip (SOC), motor controller and/or power management module to reduce system cost. The processor of the SOC can be shared with the audio monitoring module to perform the audio signal analysis, which reduces cost.

Figure 3A:
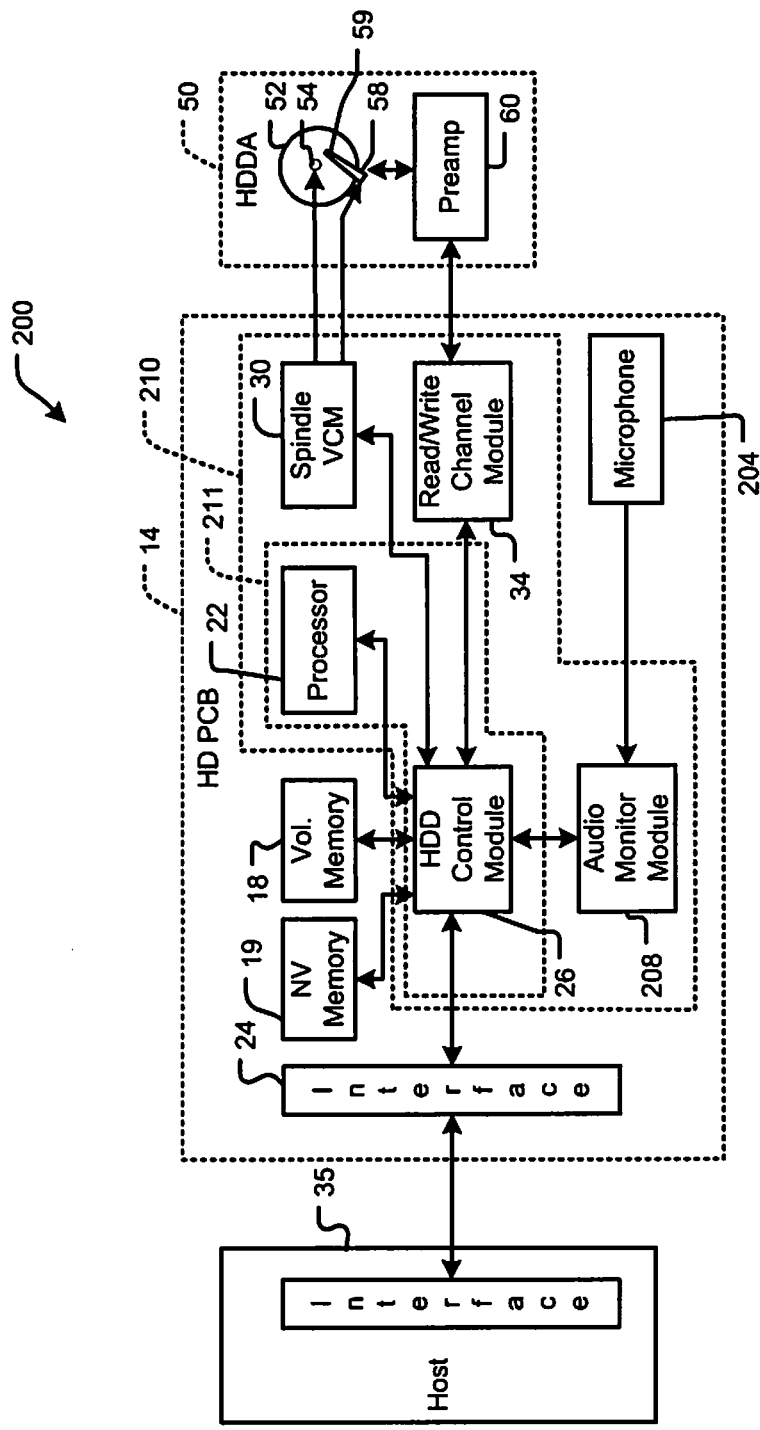
FIG. 3A is a functional block diagram of a first exemplary HDD system including an audio monitor module and microphone according to the present disclosure.
Figure 3B:
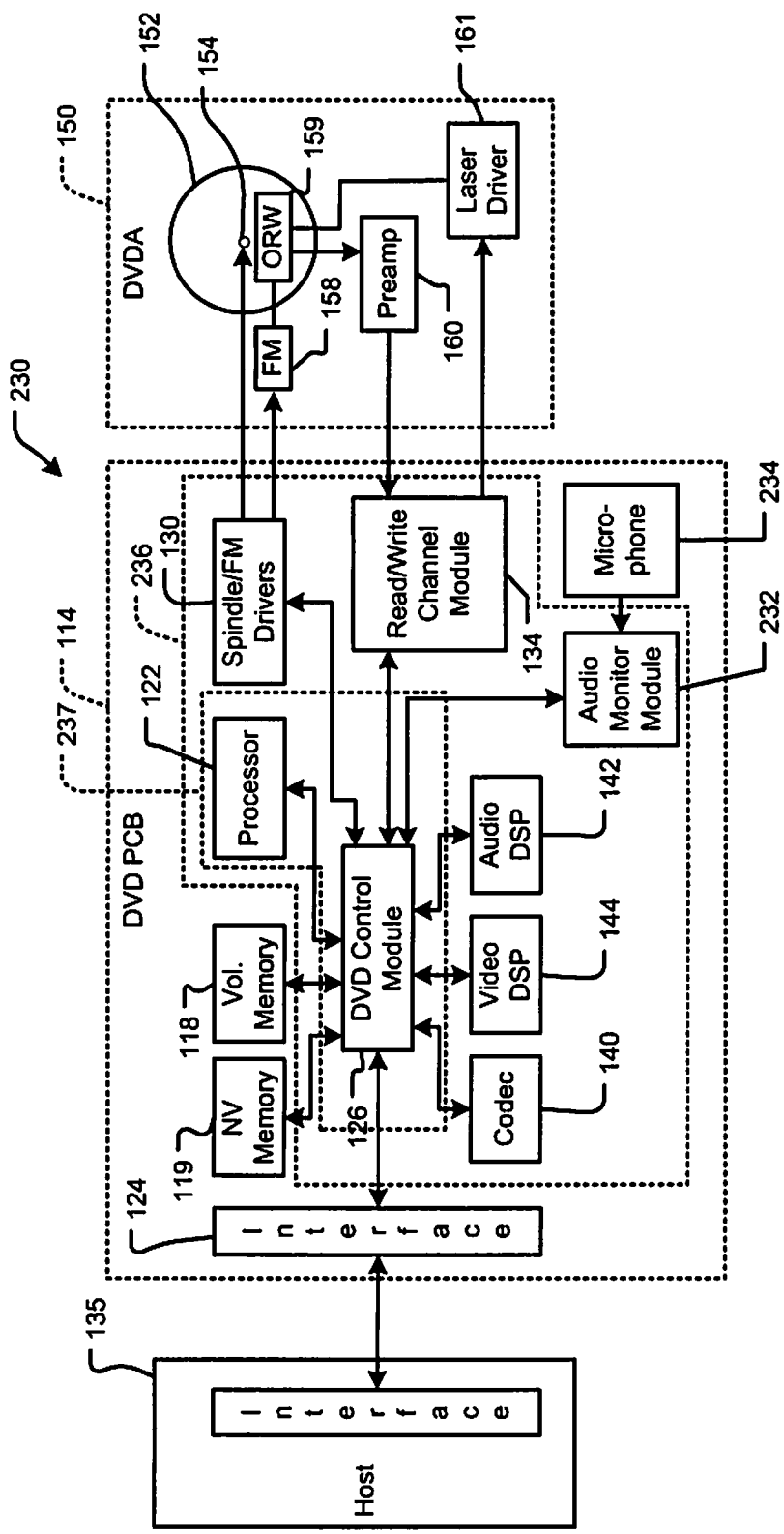
FIG. 3B is a functional block diagram of a first exemplary DVD system including an audio monitor module and microphone according to the present disclosure.

Referring now to FIGS. 3A and 3B, the audio analysis module and the microphone can be located on the PCB of the associated device. In FIG. 3A, a first exemplary HDD system 200 includes a microphone 204 and an audio monitor module 208. The microphone 204 receives audio signals during operation of the HDD system. The audio monitor module 208 converts the signals to digital signals and performs audio analysis on the signals as described above and/or below. The analysis may include monitoring various signal levels, frequencies and patterns of noise occurrences as well as the changes of monitored parameters as a function of time. The patterns may include resonances at particular frequencies or other criteria. Based on the analysis, the audio monitor module 208 selectively changes an operating parameter of the HDD system and/or performs other actions.

The microphone 204 and audio monitor module 208 may be associated with the HD PCB 14. As used herein, the term drive module may be used to refer to components of the HDD that help to control, store data, process data and/or otherwise operate the HDD such as but not limited to the HDC control module 26, the processor 22, the spindle/VCM driver module 30, the read/write channel module 34, etc. The microphone 204 and/or the audio monitor module 208 may be associated and/or integrated with one or more additional components such as the HDC control module 26, the processor 22, the spindle/VCM driver module 30, and/or the read/write channel module 34 in a system on chip (SOC) 210. Alternately, the processor 22 may be embedded in or integrated with the HDC control module 26 as indicated by dotted lines 211.

In FIG. 3B, a first exemplary DVD system 230 includes an audio monitor module 232 and a microphone 234 that are associated with the DVD PCB 114. The microphone 234 receives audio signals during operation of the DVD system. The audio monitor module 232 converts the signals to digital signals and performs analysis on the signals as described above and/or below. Based on the analysis, the audio monitor module 232 selectively changes an operating parameter of the DVD system and/or performs other actions.

The microphone 234 and audio monitor module 232 may be associated with the DVD PCB 114. As used herein, the term drive module may also be used to refer to components of the DVD that help to control, stored data, process data and/or otherwise operate the DVD such as but not limited to the control module 126, the processor 122, the spindle/FM driver module 130, the read/write channel module 134, etc. The microphone 234 and/or the audio monitor module 232 may be associated with and/or integrated with one or more additional devices such as the control module 126, the processor 122, the spindle/FM driver module 130, and/or the read/write channel module 134 in a system on chip (SOC) 236. Alternately, the processor 122 may be embedded in or integrated with the control module 126 as indicated by dotted lines 237.

Figure 4A:
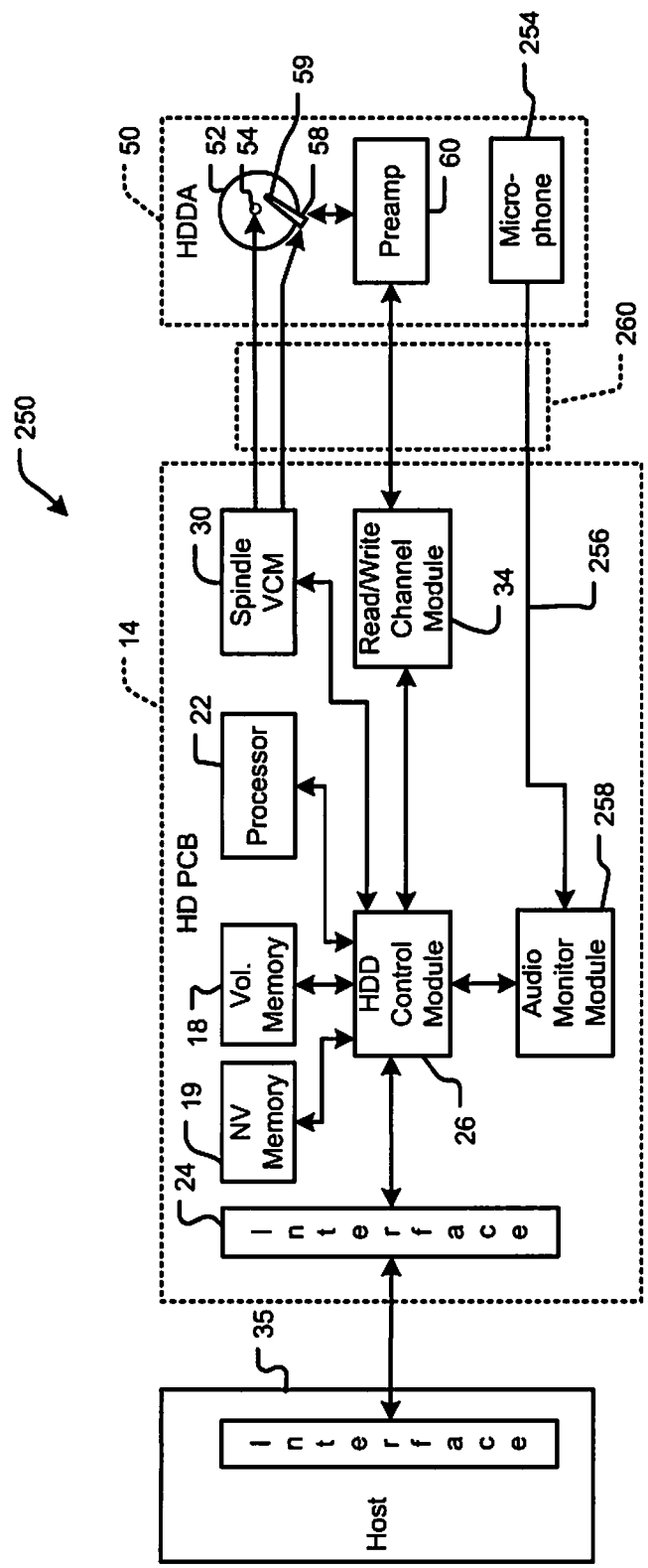
FIG. 4A is a functional block diagram of a second exemplary HDD system including an audio monitor module and microphone according to the present disclosure.
Figure 4B:
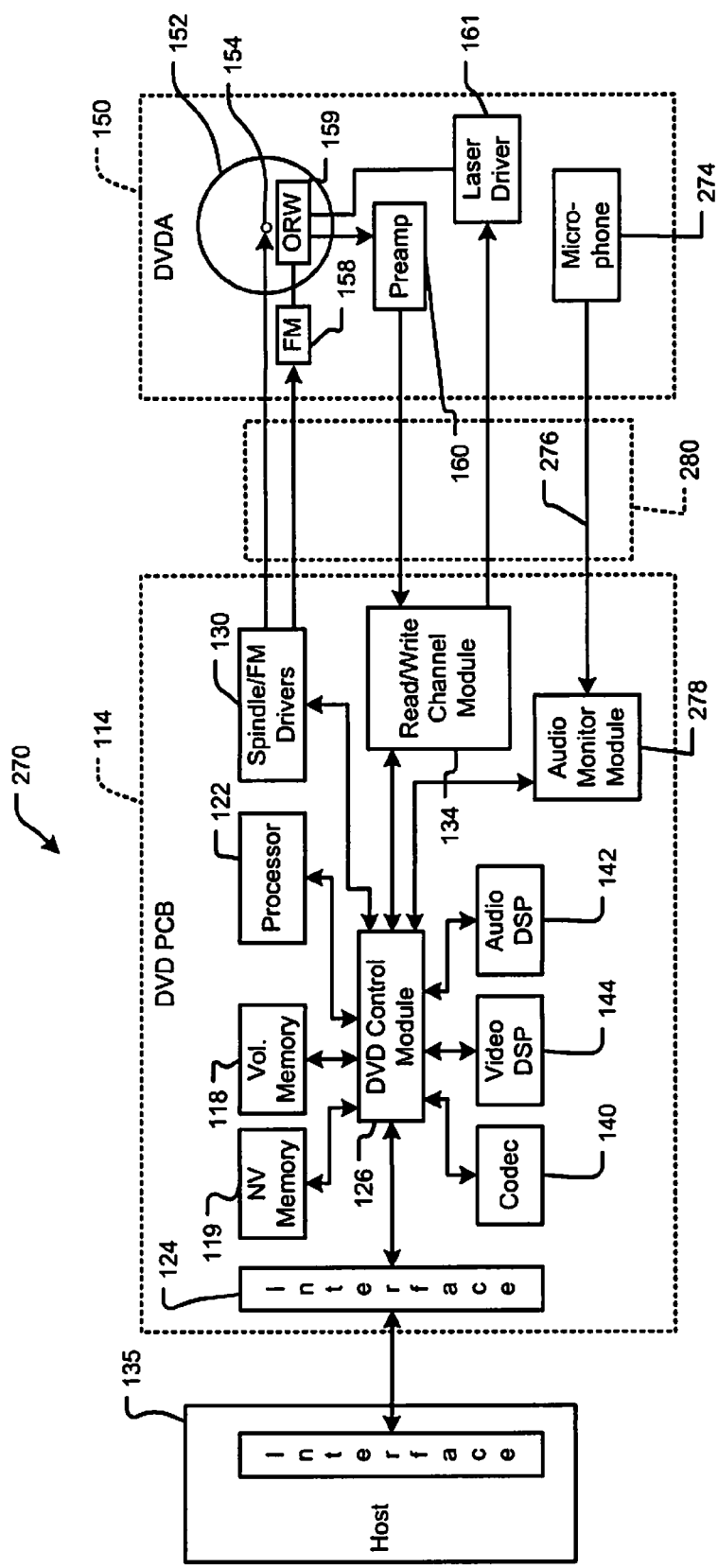
FIG. 4B is a functional block diagram of a second exemplary DVD system including an audio monitor module and microphone according to the present disclosure.

There are many different locations and/or possible implementations for the microphone and/or audio monitor module. Referring now to FIGS. 4A and 4B, second exemplary HDD and DVD systems including audio monitor modules and microphones are shown. In FIG. 4A, a HDD system 250 includes microphone 254 that is associated with the HDDA 50. A connection 256 from the microphone 254 to an audio monitor module 258 can be routed by a flex connector 260 to reduce cost. The flex connector 260 may also include conductors for other devices such as the preamplifier 60 and servo 58. In FIG. 4B, a DVD system 270 includes a microphone 274 that is associated with the DVDA 150. A connection 276 from the microphone 274 to an audio monitor module 278 can also be provided by a flex connector 280 to reduce cost.

Figure 5A:
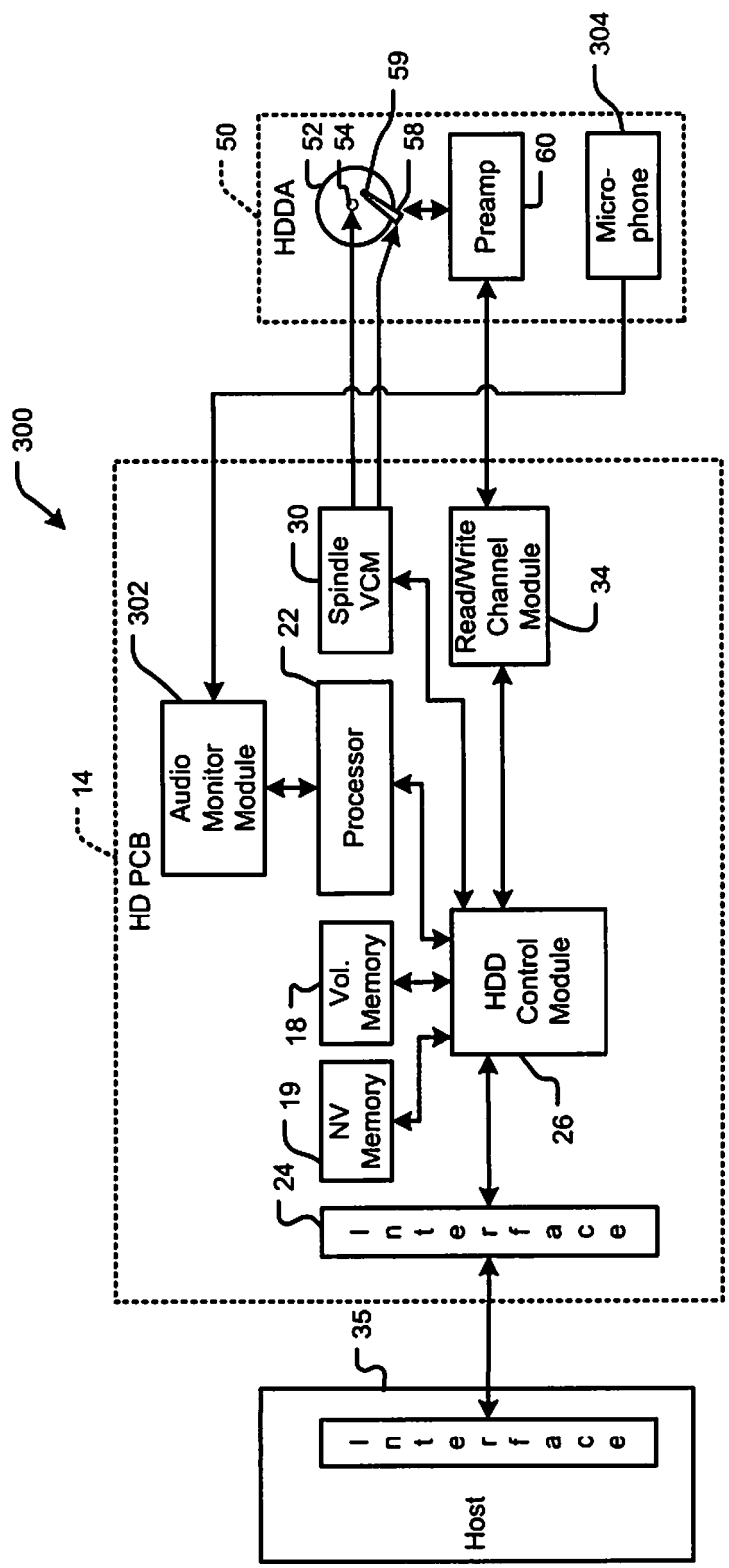
FIG. 5A is a functional block diagram of a third exemplary HDD system including an audio monitor module and microphone according to the present disclosure.
Figure 5B:
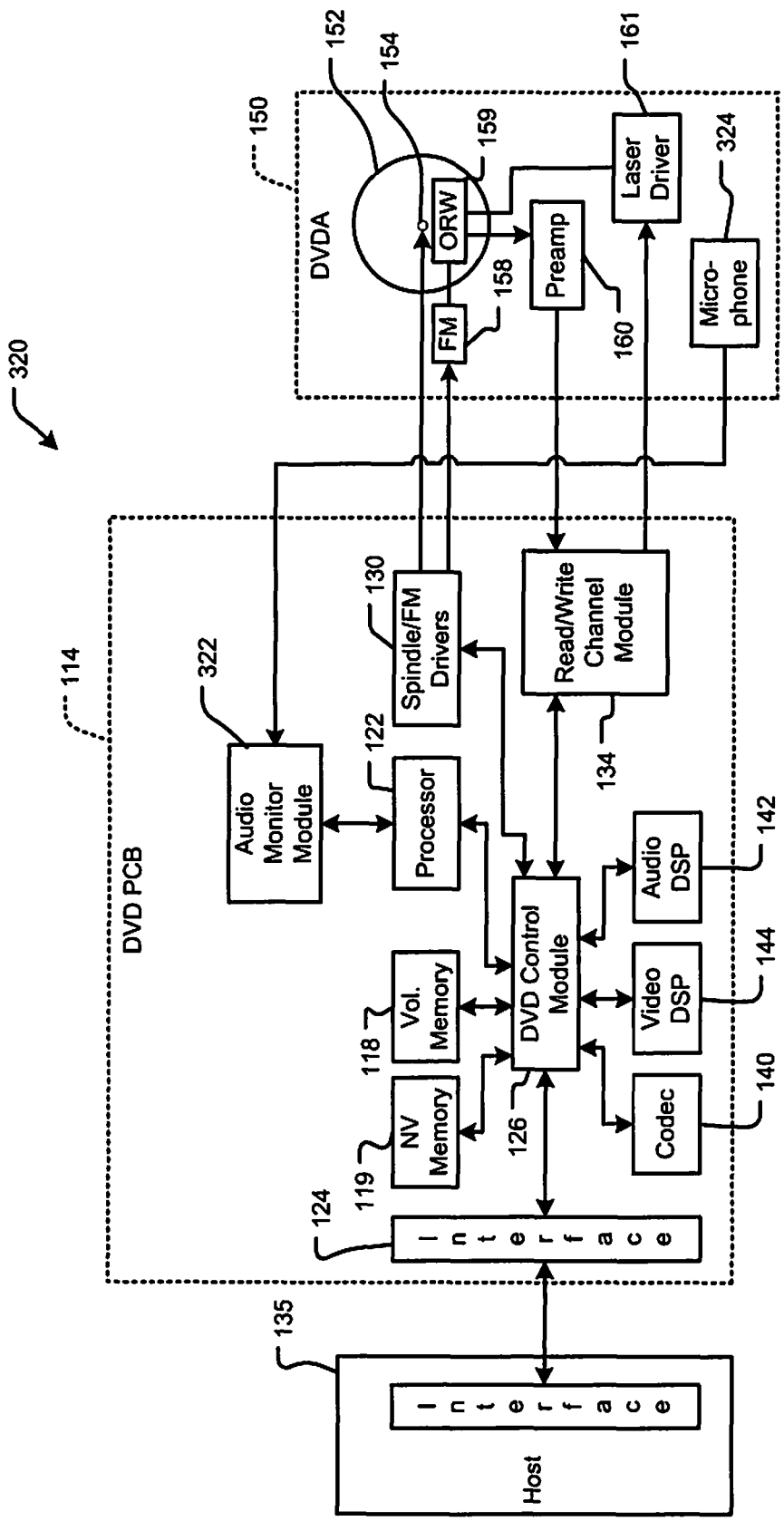
FIG. 5B is a functional block diagram of a third exemplary DVD system including an audio monitor module and microphone according to the present disclosure.

Referring now to FIGS. 5A and 5B, third exemplary HDD and DVD systems including audio monitor modules and microphones are shown. In FIG. 5A, a HDD system 300 includes an audio monitor module 302 and a microphone 304. The microphone 304 may be associated with the HDDA 50 as shown and/or with the HD PCB 14. The audio monitor module 302 may be integrated with the processor in an SOC. Processing for the audio monitor module 302 may be performed by the processor 22, which reduces cost.

In FIG. 5B, a DVD system 320 includes an audio monitor module 322 and a microphone 324. The microphone 324 may be associated with the DVDA 150 as shown and/or with the DVD PCB 114. Processing for the audio monitor module 322 may be performed by the processor 122, which reduces cost. Both the audio monitor modules 302 and 322 the processors 22 and 122 may be integrated on a SOC, respectively. Other components may also be integrated on the SOC as described above.

Figure 6A:
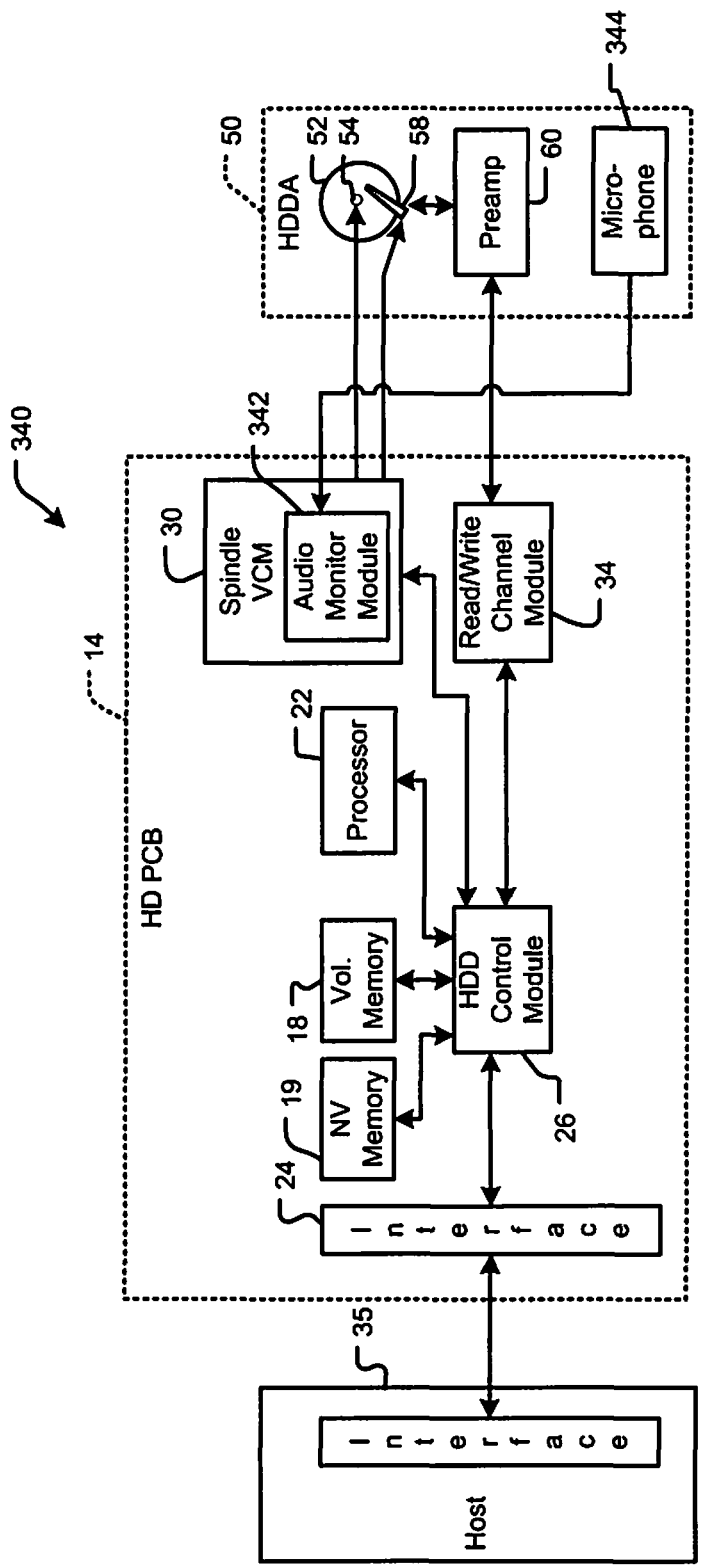
FIG. 6A is a functional block diagram of a fourth exemplary HDD system including an audio monitor module and microphone according to the present disclosure.
Figure 6B:
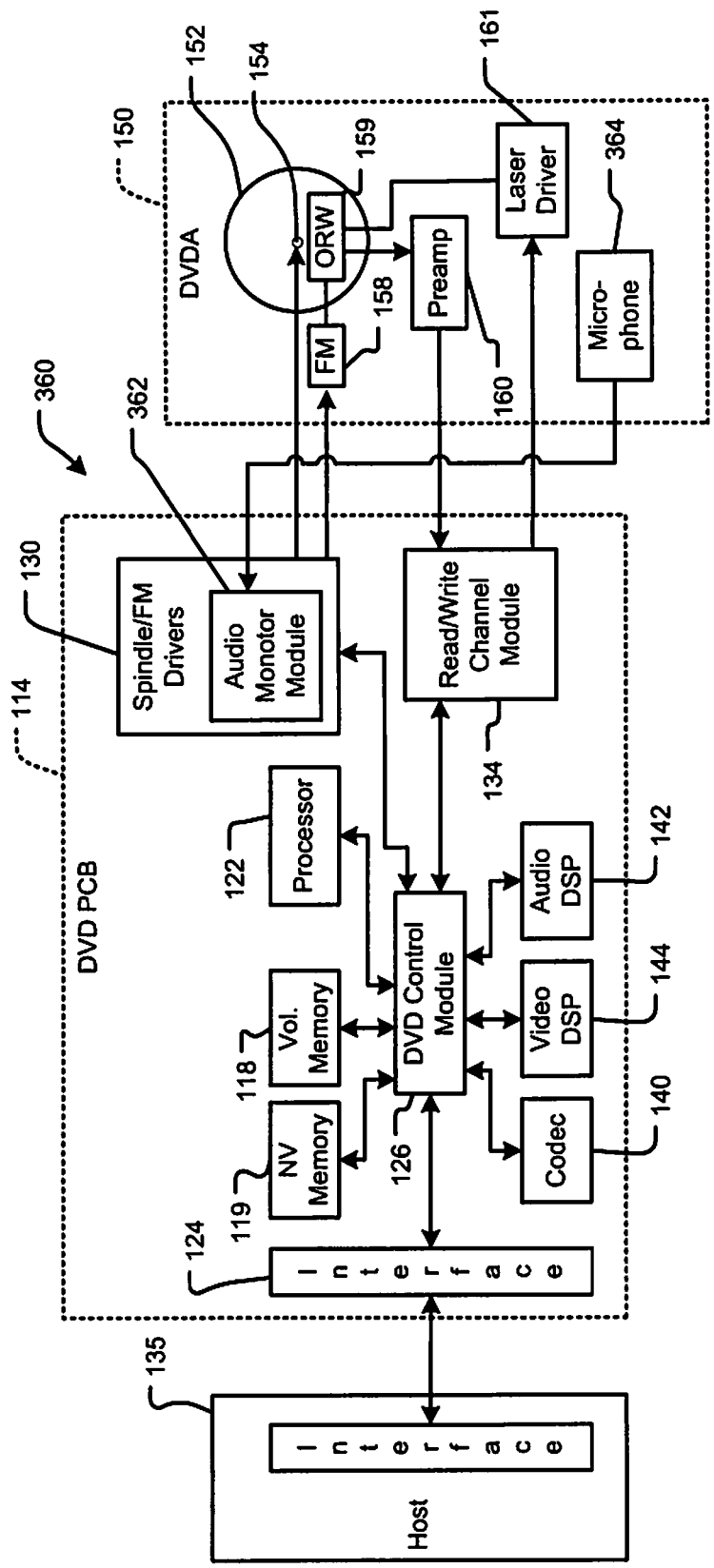
FIG. 6B is a functional block diagram of a fourth exemplary DVD system including an audio monitor module and microphone according to the present disclosure.

Referring now to FIGS. 6A and 6B, fourth exemplary HDD and DVD systems including an audio monitor module and microphone are shown. In FIG. 6A, a HDD system 340 includes an audio monitor module 342 and a microphone 344. The audio monitor module 342 is integrated with the spindle/VCM driver module 30. The microphone 344 may be located on the HDDA 50 and/or the HD PCB 14. In FIG. 6B, a DVD system 360 includes an audio monitor module 362 and a microphone 364. The audio monitor module 362 is integrated with the spindle/FM driver module 130. The microphone 364 may be located on the DVDA 150 and/or the DVD PCB 114.

As can be appreciated, the audio monitor modules may be integrated with other components of the HDD systems such as but not limited to the HDC control module 26 and/or read/write channel module 34. Likewise, the audio monitor modules may be integrated with other components of the DVD systems such as but not limited to the DSPs 140, 144 and 142, the DVD control module 126 and/or the read/write module 134. Furthermore, various components can be integrated by SOC.

Figure 7A:
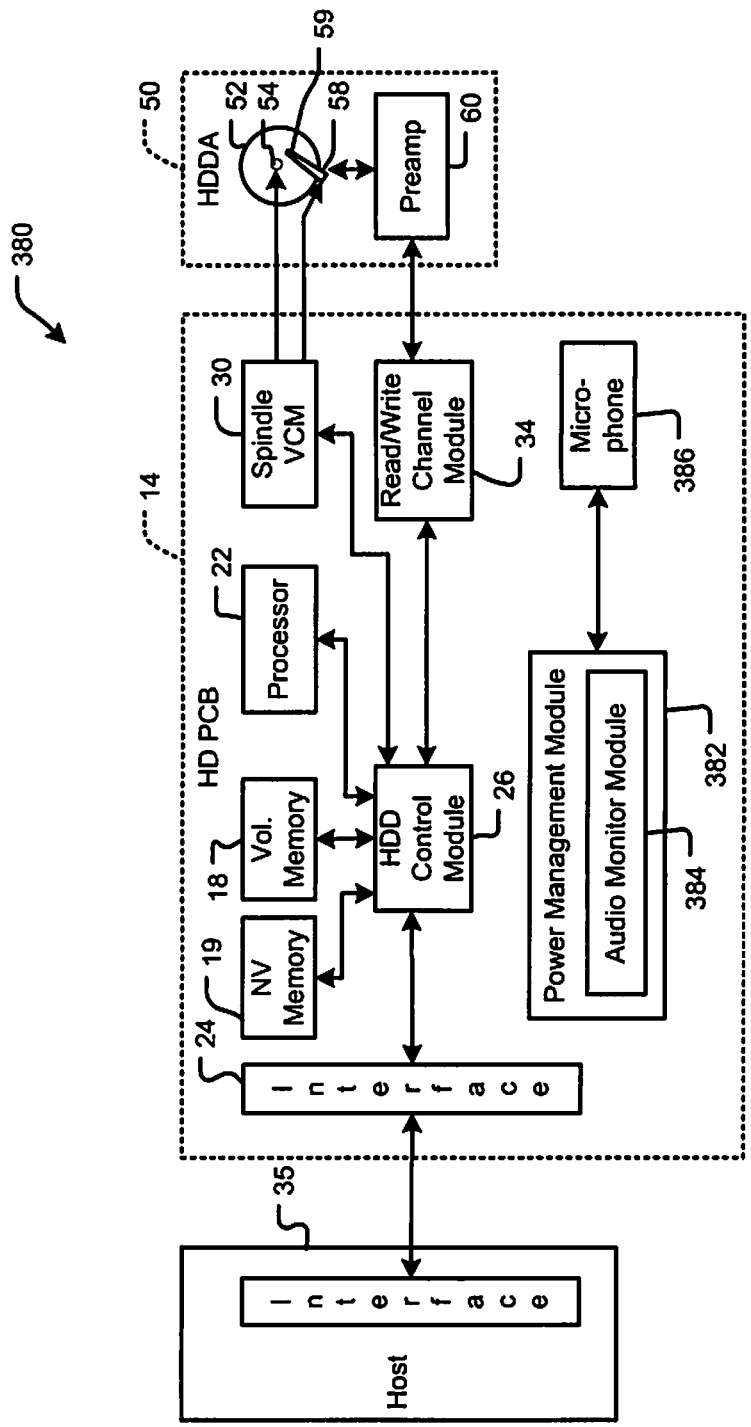
FIG. 7A is a functional block diagram of a fifth exemplary HDD system including an audio monitor module and microphone according to the present disclosure.
Figure 7B:
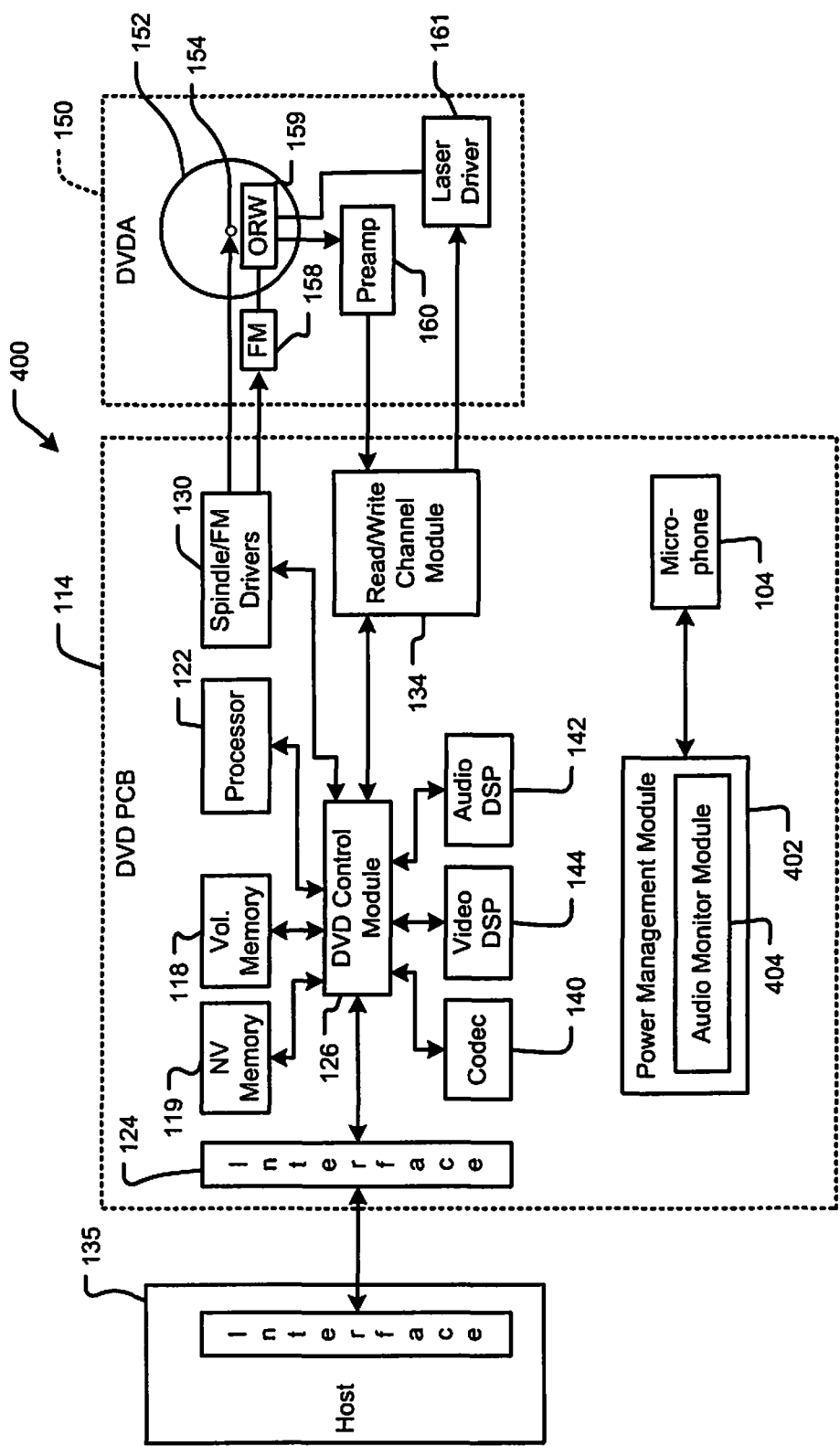
FIG. 7B is a functional block diagram of a fifth exemplary DVD system including an audio monitor module and microphone according to the present disclosure.

Referring now to FIGS. 7A and 7B, fifth exemplary HDD and DVD systems including audio monitor modules and microphones are shown. In FIG. 7A, HDD system 380 includes a power management module 382 that manages power of the HDD system 380. The HDD system 380 further includes an audio monitor module 384 and a microphone 386. The audio monitor module 384 is implemented by the power management module 382. The microphone 386 may be located on the HDDA 50 and/or the HD PCB 14.

In FIG. 7B, a DVD system 400 includes a power management module 402 that manages power of the DVD system 400. The DVD system 402 further includes an audio monitor module 404 and a microphone 406. The audio monitor module 404 is implemented by the power management module 400, which manages power for the DVD. The microphone 406 may be located on the DVDA 150 and/or the DVD PCB 114.

Figure 8:
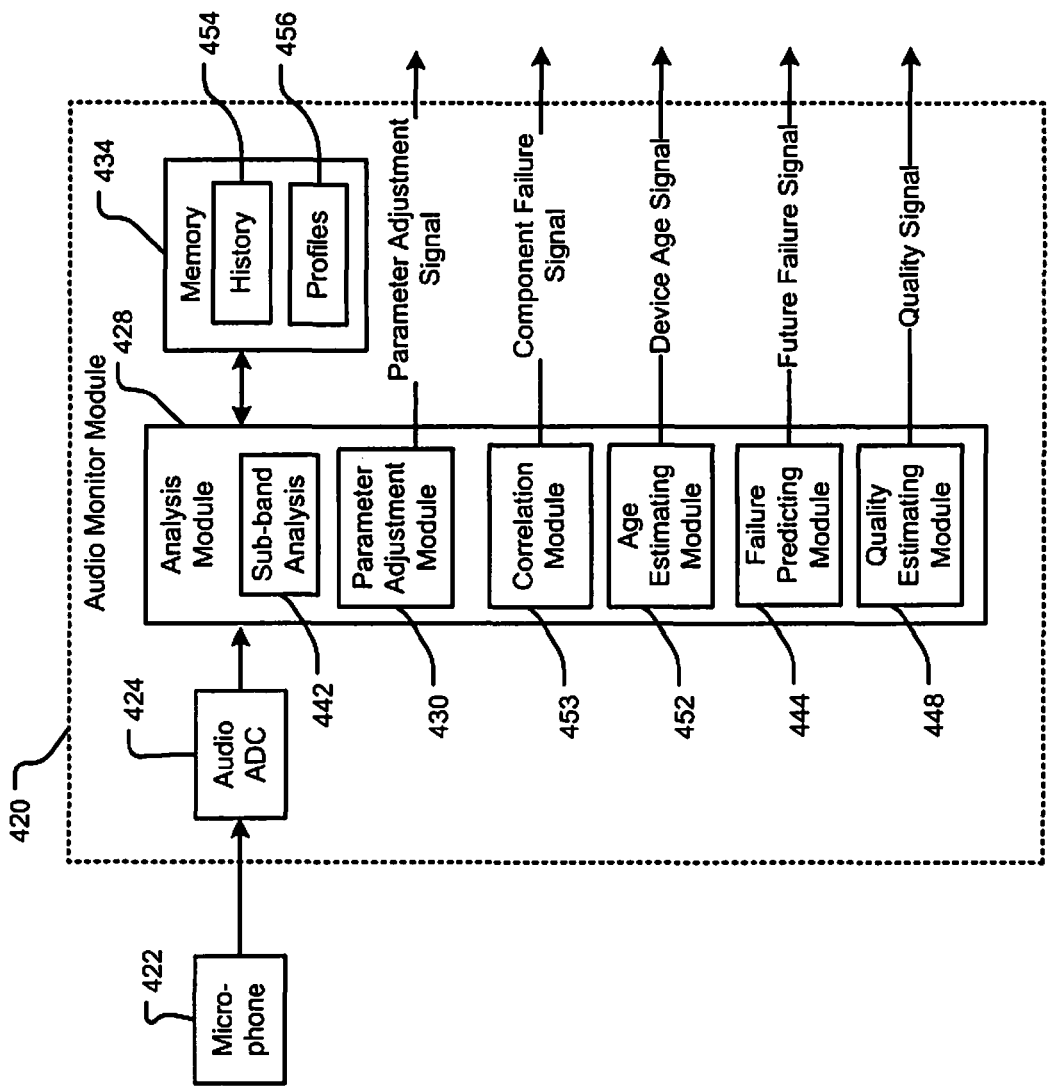
FIG. 8 is a functional block diagram of an exemplary audio monitor module according to the present disclosure.

Referring now to FIG. 8, an exemplary audio monitor module 420 according to the present disclosure is shown. The audio monitor module 420 receives an output of a microphone 422. The audio monitor module 420 includes an analog-to-digital converter (ADC) 424 that converts the analog output of the microphone to a digital audio signal. An analysis module 428 receives the digital audio output of the analog-to-digital converter 424. The analysis module 428 selectively transmits data to and receives data from memory 434. The memory may be local to the analysis module and/or shared memory such as volatile memory and NV memory. A parameter adjustment module 430 selectively adjusts operating parameters of the HDD or DVD device based on the analysis.

The analysis module 428 may include a sub-band analysis module 442 that monitors signal levels, frequencies and patterns of noise occurrences, changes of monitored parameters as a function of time, and/or other functions of the monitored parameters. The patterns may include resonances at a particular frequency or other criteria.

A failure predicting module 444 selectively predicts failures based on current and/or historical noise information and/or functions thereof. For example, the failure predicting module may extrapolate based on current and/or historical data and estimate an expected failure date. A quality analysis module 448 may estimate the quality of the HDD or DVD device based upon measured current and/or historical noise information and/or function thereof. An age estimating module 452 estimates age of the device based upon current and/or historical noise information, changes in current or historical information and/or other functions of current and/or historical noise information. The age may be relative to an expected obsolescence or service life. For example, the age estimating module 452 may monitor changes in noise levels as a function of time. The noise levels may be compared to a function, data, curve or other stored information to estimate the age of the device or component.

A correlation module 453 may be used to compare current noise information to stored noise information to identify particular failures. The memory module 434 may store noise profiles relating to possible failure modes. The correlation module 453 may correlate current and/or historical noise profiles with stored profiles. When the correlation exceeds a predetermined correlation value, the correlation module may output a fault message, initiate diagnostics and/or take other action.

Figure 9:
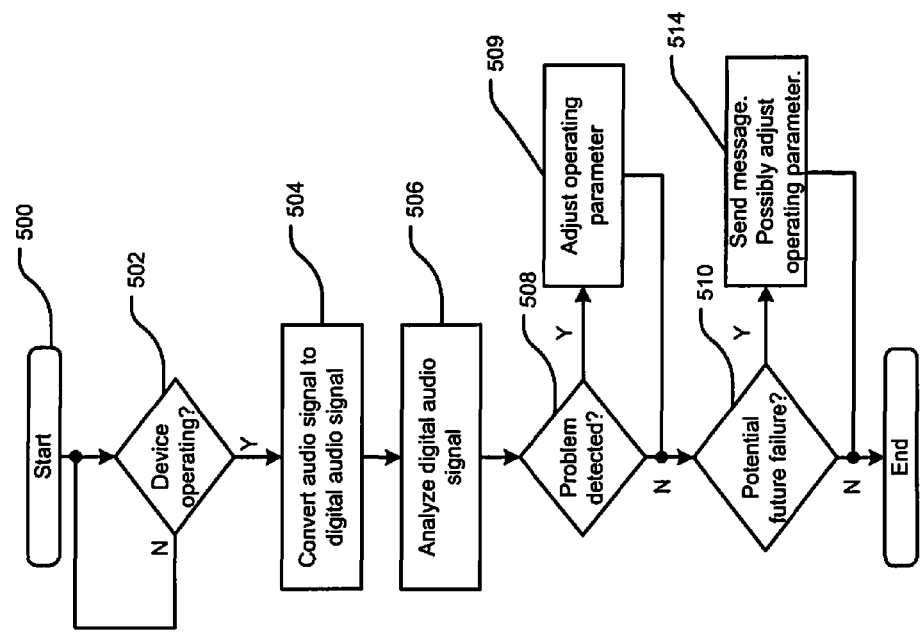
FIG. 9 is a flowchart illustrating a method for adjusting an operating parameter of a HDD or DVD system based on audio monitoring.

Referring now to FIG. 9, a flowchart illustrates steps of an exemplary method for adjusting an operating parameter of a HDD or DVD based on sensed noise information. Control begins in step 500. In step 502, control determines whether the device is operating. In step 504, control converts audio signals to digital audio signals. In step 506, control analyzes digital audio signals. In step 508, control determines whether a problem has been detected. In other words, control determines where the noise information indicates a problem. For example, the monitored noise parameter exceeds a threshold. If true, control adjusts an operating parameter of the HDD or DVD device in step 509. For example, rotational speed, scanning speed, voltage level, current level or any other parameter may be adjusted. If step 508 is false, control continues with step 510 and determines whether there is a potential future failure based on current and/or historical noise information and/or functions thereof. If step 510 is true, control sends a message to a host device and/or adjusts an operating parameter of the HDD or DVD device in step 514.

Figure 10:
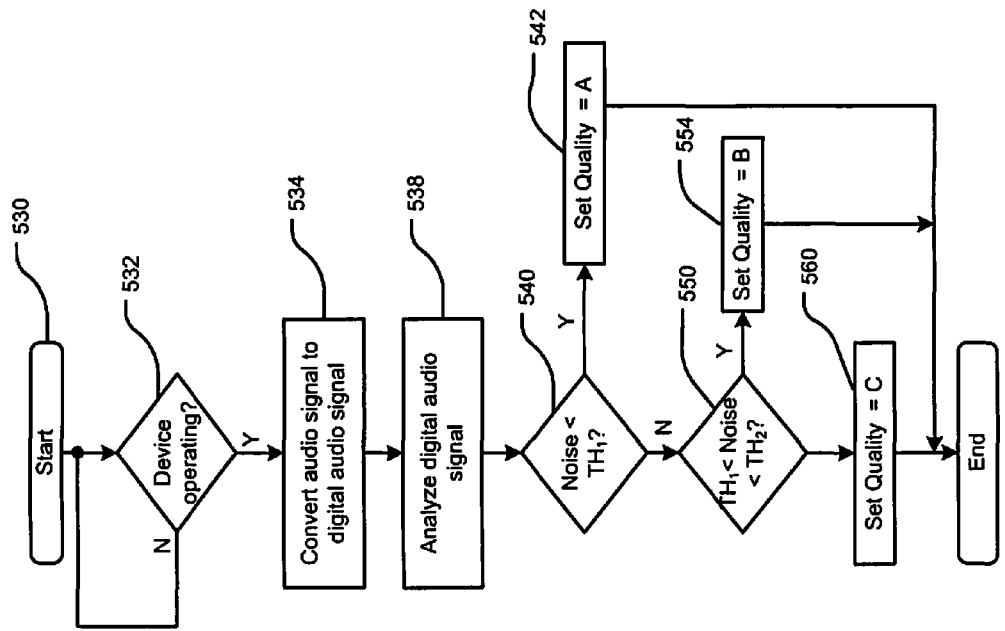
FIG. 10 is a flowchart illustrating a method for determining product quality of a HDD or DVD system based on audio monitoring.

Referring now to FIG. 10, a flowchart illustrates steps of a method for determining device quality of HDD or DVD systems based on sensed noise information. Control begins with step 530. In step 532, control determines whether the device is operating. If true, control converts audio signals to digital audio signals in step 534.

In step 538, control analyzes digital audio signals. In step 540, control compares current and/or historical noise information and/or a function thereof to a first threshold. If the noise level is less than a first threshold, control sets quality to a first quality value in step 542. If step 540 is false, control determines whether the current and/or historical noise information is greater than a first threshold but less than a second threshold in step 550. If true, control sets quality to a second quality value in step 554. Otherwise control sends quality to a third quality value in step 560. While three quality values or levels are described, additional or fewer quality values may be used. The quality values or levels may be used for variable pricing and/or other marketing decisions.

Figure 11:
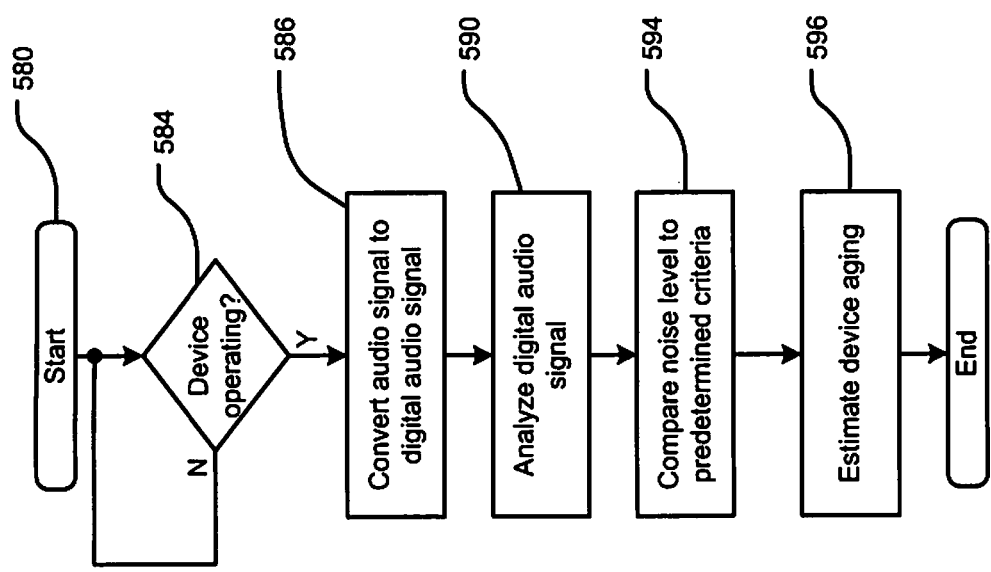
FIG. 11 is a flowchart illustrating a method for estimating aging of a HDD or DVD system based on audio monitoring.

Referring now to FIG. 11, a flowchart illustrates steps of a method for estimating aging of HDD or DVD systems based on current and/or historical noise levels. Control begins in step 580. In step 584, control determines whether the device is operating. In step 586, control converts audio signals to digital audio signals. In step 590, control analyzes the digital audio signals. In step 594, control compares current and/or historical noise levels to predetermined thresholds, functions or other predetermined criteria. In step 596, control estimates an age of the HDD or DVD system and/or one or more components thereof based upon the comparison.

Figure 12:
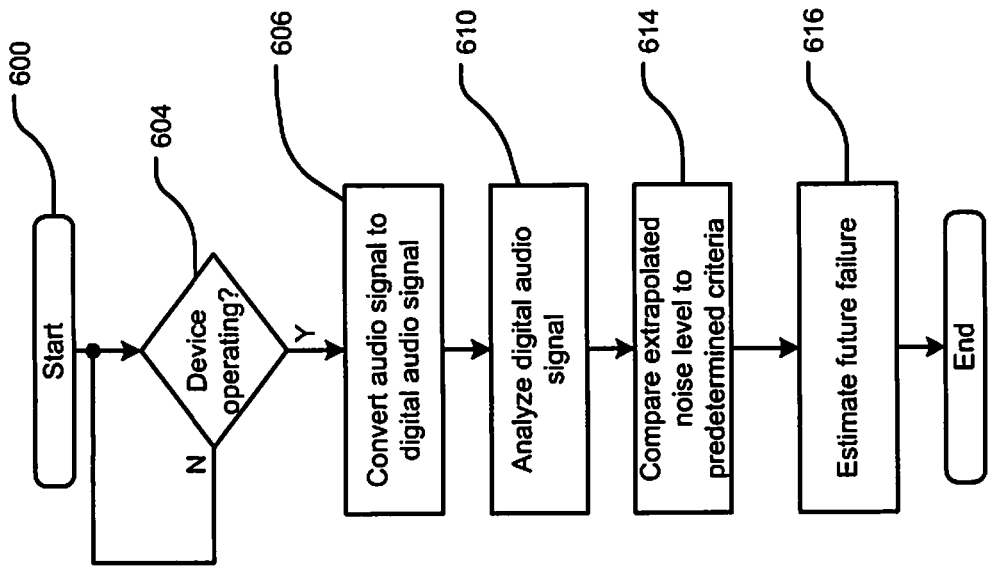
FIG. 12 is a flowchart illustrating a method for estimating future failures of a HDD or DVD system based on audio monitoring.

Referring now to FIG. 12, a flowchart illustrates steps of a method for estimating future failures of HDD or DVD systems based on current and/or historical noise levels. Control begins in step 600. In step 604, control determines whether the device is operating. In step 606, control converts audio signals to digital audio signals. In step 610, control analyzes the digital audio signals. In step 614, control extrapolates future performance based on current and/or historical noise levels and compares the extrapolations to predetermined thresholds, functions or other predetermined criteria. In step 616, control estimates future failure of the HDD or DVD system and/or one or more components thereof based upon the comparison. For example, control may provide an estimated failure date or number of estimated operating hours until failure.

Figure 13:
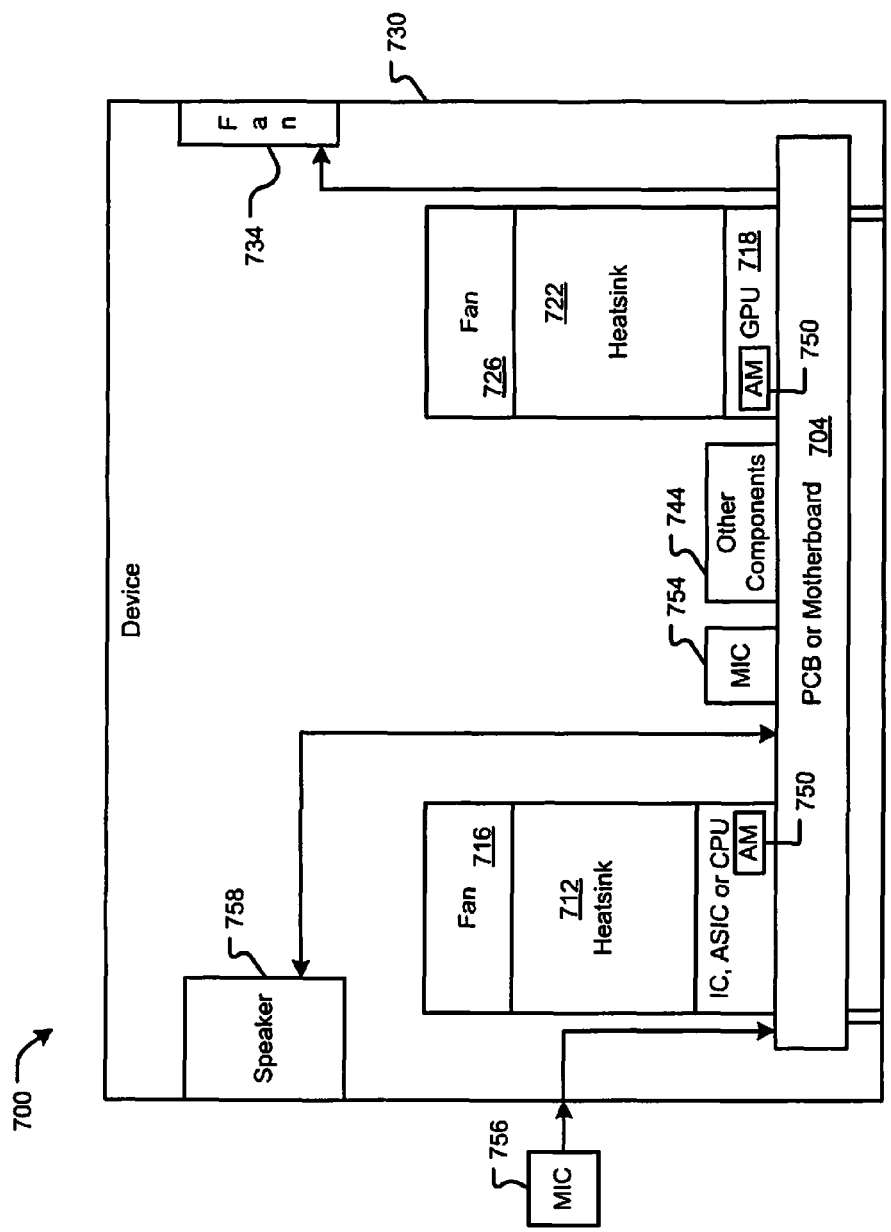
FIG. 13 is a functional block diagram of a device including an integrated circuit such as a central processing unit, a graphic processing unit or an application specific integrated circuit and a fan.

Referring now to FIG. 13, a device 700 is shown to include a printed circuit board (PCB) (not shown) or a motherboard 704. For example only, the device 700 may be a computer system, a network switch, a router, a server, or other type of electronic device that includes an integrated circuit, that is arranged on a chassis and/or in an enclosure, and that uses a fan for cooling. One or more integrated circuits 708 may be arranged on the motherboard 704.

For example only, the integrated circuit 708 may include a central processing unit (CPU), an application specific integrated circuit (ASIC), a graphics processing unit (GPU) and/or other type of integrated circuit. A heatsink 712 communicates thermally with the integrated circuit 708 and absorbs heat therefrom. A fan 716 circulates air over the heatsink 712 to dissipate heat.

One or more other types of integrated circuits such as a graphics processing unit (GPU) 718 may be arranged on the motherboard 704. A heatsink 722 communicates thermally with the GPU 718 and transfers heat therefrom. A fan 726 circulates air over the heatsink 722 to dissipate heat. The motherboard 704 may be arranged on a chassis and/or in an enclosure 730. One or more additional fans 734 may provide additional cooling inside of the enclosure. Other components 744 such as memory modules and/or other modules or devices (not shown) may be arranged on the motherboard 704.

In operation, the integrated circuit 708 may include an audio monitoring module 750 that monitors audio signals generated by the fans 716, 726 and/or 734. A microphone 754 may be arranged inside of the enclosure 730. Alternately, a microphone 756 may be arranged outside of the enclosure 730. Alternately, a speaker 758 may be used as a microphone. Sound waves impacting the speaker 756 may be sensed and used for analysis.

The integrated circuit 708 and/or the GPU 718 may include the audio monitoring (AM) module 750 that performs audio analysis on the audio signals as described above. Alternately, the AM module 750 may be a stand alone device or integrated with any other component or integrated circuit. The AM module 750 may perform sub-band analysis. Operation of the fans can be improved by monitoring signal levels, frequencies and noise patterns as well as the changes of monitored parameters as a function of time.

Fan operating parameters may be automatically adjusted to lower acoustic noise. By doing so, user annoyance may be decreased. Operation of the fan away from resonance modes can be performed. In addition, real time monitoring of fan noise may be used to predict future failure events. Analysis of historical data may be performed to estimate and monitor aging of the fan.

The audio monitoring may also be used as a relatively low cost method for differentiating product quality. For example, this approach can be used to separate high quality or low quality fans from other medium-quality fans. Lower noise devices tend to be more reliable than the higher noise ones, particularly for fans having the same or similar designs. In addition, real time monitoring of mechanical components can be used to improve future quality levels.

While HDD and DVD systems are disclosed, the present disclosure applies to other rotating storage devices, magnetic storage devices and/or optical storage devices.

In addition to or instead of altering an operating parameter of the component as described above, the audio monitoring module may generate signals to provide an indication as to how the component is operating. For example only, when the component is making more noise that is typically acceptable, the audio monitoring module may generate an indication signal to a host device. For example only, when the fan is making too much noise, the CPU may send an error message to the operating system (OS) to notify the OS and/or the user.

The audio monitoring module may provide a list of actions that can be taken by the user. For example, the audio monitoring module may allow the user to select from a plurality of different options. Some of the options may include operating in restricted modes such as low power modes, limited processing modes, etc. For implementations with fans, the user may select a safe shutdown mode when the temperature of the device reaches a predetermined temperature value.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. An integrated circuit for controlling a data storage device, the integrated circuit comprising:
   a drive module configured to control operation of the data storage device, wherein the data storage device is of a particular quality; and
   an audio monitoring module in communication with the drive module, wherein the audio monitoring module is configured to analyze an audio signal generated by the data storage device while the drive module is controlling the operation of the data storage device,
   wherein the particular quality of the data storage device is determinable based on the analysis of the audio signal, and
   wherein the drive module and the audio monitoring module are arranged on a printed circuit board of the data storage device.

2. The integrated circuit of claim 1, wherein the particular quality of the data storage device corresponds to a high quality or a low quality.

3. The integrated circuit of claim 1, wherein the particular quality of the data storage device corresponds to a reliability of the data storage device.

4. The integrated circuit of claim 1, wherein the drive module comprises a read/write channel module.

5. The integrated circuit of claim 1, wherein the drive module comprises a processor.

6. The integrated circuit of claim 1, wherein the drive module comprises a spindle/voice coil motor drive module or a spindle/feed motor module.

7. A data storage device comprising the integrated circuit of claim 1.

8. The data storage device of claim 7, further comprising a microphone configured to generate the audio signal.

9. The data storage device of claim 8, wherein:
   the data storage device further comprises a first component, wherein the first component is configured to operate in accordance with an operating parameter; and
   the audio monitoring module is configured to selectively adjust the operating parameter of the first component based on the analysis of the audio signal.

10. The data storage device of claim 9, further comprising:
    a rotatable storage medium, wherein the first component is configured to rotate the rotatable storage medium.

11. A method for controlling a data storage device, the method comprising:
operating the data storage device, wherein the data storage device is of a particular quality;
analyzing an audio signal generated by the data storage device during the operation of the data storage device;
determining the particular quality of the data storage device based on the analysis of the audio signal; and
arranging, on a printed circuit board of the data storage device, components configured to (i) operate the data storage device and (ii) analyze the audio signal generated by the data storage device during the operation of the data storage device.

12. The method of claim 11, wherein the particular quality of the data storage device corresponds to a high quality or a low quality.

13. The method of claim 11, wherein the particular quality of the data storage device corresponds to a reliability of the data storage device.

14. The method of claim 11, wherein:
the data storage device further comprises a first component, wherein the first component is configured to operate in accordance with an operating parameter; and
the method further comprises selectively adjusting the operating parameter of the first component based on the analysis of the audio signal.

15. A computer program for controlling a data storage device, the computer program being tangibly stored on a computer-readable medium and comprising instructions to cause a programmable processor to:
operate the data storage device, wherein the data storage device is of a particular quality;
analyze an audio signal generated by the data storage device during the operation of the data storage device; and
determine the particular quality of the data storage device based on the analysis of the audio signal,
wherein components configured to (i) operate the data storage device and (ii) analyze the audio signal generated by the data storage device during the operation of the data storage device are arranged on a printed circuit board of the data storage device.

16. The computer program of claim 15, wherein the particular quality of the data storage device corresponds to a high quality or a low quality.

17. The computer program of claim 15, wherein the particular quality of the data storage device corresponds to a reliability of the data storage device.

18. The computer program of claim 15, wherein:
the data storage device further comprises a first component, wherein the first component is configured to operate in accordance with an operating parameter; and
the computer program further comprises instructions to cause a programmable processor to selectively adjust the operating parameter of the first component based on the analysis of the audio signal.

* * * * *